US012700607B2

(12) United States Patent
Hwang et al.

(10) Patent No.: US 12,700,607 B2
(45) Date of Patent: Aug. 4, 2026

(54) END PLATE, FASTENING BAR, AND FUEL CELL STACK INCLUDING THE SAME

(71) Applicants:Hyundai Motor Company, Seoul (KR); Kia Corporation, Seoul (KR); Kolon Spaceworks Co., Ltd., Gyeongsangnam-do (KR)

(72) Inventors: Duck Hyoung Hwang, Seoul (KR); Hyun Yoo Kim, Seoul (KR); Kyung Ho Kim, Seongnam (KR); Hyun Chul Lee, Siheung (KR); Young Ju Kim, Seoul (KR); Jun Sung Goo, Suwon (KR); Dong Won Kim, Gimpo (KR); Chang Hun Lee, Gumi (KR)

(73) Assignees: Hyundai Motor Company, Seoul (KR); Kia Corporation, Seoul (KR); Kolon Spaceworks Co., Ltd., Gyeongsangnam-do (KR)

( * ) Notice: Subject to any disclaimer, the term of this patent is extended or adjusted under 35 U.S.C. 154(b) by 1008 days.

(21) Appl. No.: 17/568,631

(22) Filed: Jan. 4, 2022

(65) Prior Publication Data

US 2022/0216497 A1 Jul. 7, 2022

(30) Foreign Application Priority Data

Jan. 5, 2021 (KR) ........................ 10-2021-0000929

(51) Int. Cl.
*H01M 8/248* (2016.01)

(52) U.S. Cl.
CPC .................................. *H01M 8/248* (2013.01)

(58) Field of Classification Search
CPC .. H01M 8/248; H01M 8/2475; H01M 8/2465; H01M 8/247; Y02E 60/50
See application file for complete search history.

(56) References Cited

U.S. PATENT DOCUMENTS

| | | | |
|---|---|---|---|
| 2003/0152819 A1 | 8/2003 | Hatoh et al. | |
| 2009/0136807 A1* | 5/2009 | Kobayashi .......... | H01M 8/1039 429/435 |
| 2013/0059227 A1* | 3/2013 | Suh ..................... | H01M 8/2483 429/482 |
| 2013/0065157 A1* | 3/2013 | Suh ..................... | H01M 8/0221 429/510 |
| 2015/0171457 A1* | 6/2015 | Kim ..................... | H01M 8/248 429/508 |

(Continued)

FOREIGN PATENT DOCUMENTS

| | | |
|---|---|---|
| JP | H1134105 A | 2/1999 |
| JP | 2009163907 A | 7/2009 |

(Continued)

*Primary Examiner* — Muhammad S Siddiquee
(74) *Attorney, Agent, or Firm* — Fox Rothschild LLP

(57) ABSTRACT

Disclosed are an end plate that maintains the flatness of a fuel cell stack formed by stacking a plurality of fuel cells so that a uniform surface pressure is maintained, a fastening bar, and the fuel cell stack including the same. The fuel cell stack includes a plurality of fuel cells, an end plate for the fuel cell stack is disposed on both side surfaces of the fuel cell stack to maintain the flatness of the fuel cell stack so that the uniform surface pressure is maintained, and a fastening bar is disposed outside the fuel cell stack has both ends coupled to the end plate for the fuel cell stack.

24 Claims, 10 Drawing Sheets

(56)          References Cited

U.S. PATENT DOCUMENTS

| | | | |
|---|---|---|---|
| 2015/0184333 A1* | 7/2015 | Arai ......................... | C08J 5/249 |
| | | | 428/327 |
| 2020/0255651 A1* | 8/2020 | Takao ..................... | C08L 63/04 |
| 2021/0234185 A1* | 7/2021 | Hartwell ............... | H01M 8/247 |
| 2024/0116218 A1* | 4/2024 | Matsumoto ............. | B29C 70/38 |

FOREIGN PATENT DOCUMENTS

| | | |
|---|---|---|
| KR | 100757131 B1 | 9/2007 |
| KR | 20090028941 A | 3/2009 |
| KR | 100980927 B1 | 9/2010 |
| KR | 2011-0059982 A | 6/2011 |
| KR | 20120051146 A | 5/2012 |
| KR | 101315739 B1 | 10/2013 |
| KR | 101349017 B1 | 1/2014 |
| KR | 101543131 B1 | 8/2015 |
| KR | 20170067284 A | 6/2017 |
| KR | 2017-0091424 A | 8/2017 |

* cited by examiner

END PLATE, FASTENING BAR, AND FUEL CELL STACK INCLUDING THE SAME

CROSS-REFERENCE TO RELATED APPLICATION

This application claims under 35 U.S.C. § 119(a) the benefit of priority to Korean Patent Application No. 10-2021-0000929 filed on Jan. 5, 2021, the entire contents of which are incorporated herein by reference.

TECHNICAL FIELD

The present invention relates to an end plate, a fastening bar, and a fuel cell stack including the same.

BACKGROUND

As environmental regulations are strengthened in the vehicle industry, interest in new energy sources that do not emit carbon dioxide ($CO_2$) is increasing. A hydrogen fuel cell that is one of the power sources for vehicles obtains electrical energy through an electrochemical reaction between hydrogen and oxygen. The hydrogen fuel cell has been reported as a clean energy source of the future due to the advantage of not emitting pollutants because it emits only reaction heat and pure water during reaction. Automakers around the world are trying to develop such a hydrogen fuel cell.

The hydrogen fuel cell has components such as a separator, a bipolar plate, a gasket, and a current collector stacked to constitute a single cell. And multiple cells are fixed to an end plate to constitute a fuel cell stack.

The end plate is a major component that supports the multiple cells constituting the stack. The end plate is a planar component that supports both ends of the stack and is generally made of a thick steel material to maintain structural rigidity and uniform surface pressure of the stack.

The steel end plate is thick to maintain uniform surface pressure and secure structural rigidity, which makes the product very heavy. In addition, heat loss to the end plate occurs in cells adjacent to the steel end plate during cold start, thereby decreasing the efficiency of the fuel cell. In addition, there is the disadvantage in that the steel plate is coated with Teflon or an insulating plate is additionally mounted thereon to improve the insulating property.

The above information disclosed in this Background section is only for enhancement of understanding of the background of the invention and accordingly it may include information that does not form the prior art that is already known in this country to a person of ordinary skill in the art.

SUMMARY

In preferred aspect, provided are components of a fuel cell stack that may secure structural stability and improve fuel cell efficiency while achieving the effect of reducing the weight of a fuel cell.

In an aspect, provided is an end plate for a fuel cell stack. The end plate includes: a main body part, and a property forming part disposed in the main body part to exert mechanical properties. Preferably, the end plate can maintain the flatness of a fuel cell stack formed by stacking a plurality of fuel cells so that a uniform surface pressure is maintained, The main body part and the property forming part may include a composite material.

The property forming part may include continuous fiber thermoplastic (CFT).

The main body part may include long fiber thermoplastic (LFT).

Each of the continuous fiber thermoplastic and the long fiber thermoplastic may include: an amount of about 40 to 60 wt % of a reinforced fiber and an amount of 40 to 60 wt % of a thermoplastic resin, respectively, based on the total weight of the continuous fiber thermoplastic and the long fiber thermoplastic.

The reinforced fiber can be at least one selected from the group consisting of glass fiber, carbon fiber, and aramid fiber, or the thermoplastic resin may include polypropylene (PP) or polyamide (PA).

The property forming part may include: a first property part and a second property part formed to be symmetrical with respect to surfaces in contact with each other.

Each of the first property part and the second property part may include: a property main body having a weight reduction groove formed on both ends of a terminal hole in a longitudinal direction, a first rib formed on both ends of the property main body in the longitudinal direction to secure mechanical properties, and a second rib formed on both ends of the property main body in a width direction to secure mechanical properties.

The property main body of the first property part and the property main body of the second property part may be in contact with each other, the first rib of the first property part and the first rib of the second property part may face each other at an interval, and the second ribs of the first property part and the second property part may be disposed to face each other at an interval and disposed to be vertically symmetrical with respect to surfaces with which the first property part and the second property part are in contact.

The first rib may be formed entirely in the width direction of the property main body and the second rib may be formed at a preset length from a center to both sides in the longitudinal direction of the property main body.

For the first property part and the second property part, surfaces in contact with each other may be coupled to each other by thermal fusing by resin heat generated in an injection process.

The thickness of the end plate for the fuel cell stack may be about 25 mm to 30 mm.

A ratio of the thickness of the property forming part to the thickness of the main body part may be about 15% to 25%.

In an aspect, provided is a fastening bar for a fuel cell stack includes: a bar main body in contact with an outside of the fuel cell stack, and a coupling part coupled to the end plate by bending one end and the other end of the bar main body in one direction. Preferably, the fastening bar may be fastened to an end plate that maintains the flatness of a fuel cell stack formed by stacking a plurality of fuel cells so that a uniform surface pressure is maintained to fix the fuel cell stack.

The bar main body and the coupling part formed integrally may include: a design layer and a property layer connected with the design layer to exert mechanical properties.

The design layer and the property layer may include a composite material.

The property layer may include continuous fiber thermoplastic (CFT), and the design layer can be made of long fiber thermoplastic (LFT).

Each of the continuous fiber thermoplastic and the long fiber thermoplastic may include: an amount of about 20 to 40 wt % of the reinforced fiber and an amount of about 60 to 80 wt % of the thermoplastic resin, respectively, based on the total weight of the continuous fiber thermoplastic and the long fiber thermoplastic.

Alternatively, each of the continuous fiber thermoplastic and the long fiber thermoplastic may include: an amount of about 40 to 60 wt % of the reinforced fiber and 40 to 60 wt % of the thermoplastic resin, respectively, based on the total weight of the continuous fiber thermoplastic and the long fiber thermoplastic.

The reinforced fiber may include one or more selected from the group consisting of glass fiber, carbon fiber, and aramid fiber, and the thermoplastic resin may include polypropylene (PP) or polyamide (PA).

The thicknesses of the bar main body and the coupling part may be about 1 mm to 5 mm.

The coupling part may include a through hole through which a fastening means coupled to the end plate passes.

A fastening bar for a fuel cell stack includes: a bar main body in contact with an outside of the fuel cell stack, and a coupling part coupled to the end plate by bending one end and the other end of the bar main body in one direction. Preferably, the fastening bar may be fastened to an end plate that maintains the flatness of a fuel cell stack formed by stacking a plurality of fuel cells so that a uniform surface pressure is maintained to fix the fuel cell stack.

The bar main body and the coupling part formed integrally may include: a property layer made of a composite material to exert mechanical properties.

The property layer may include long fiber thermoplastic (LFT).

Each of the long fiber thermoplastic may include an amount of about 20 to 40 wt % of a reinforced fiber and an amount of about 60 to 80 wt % of a thermoplastic resin, based on the total weight of the long fiber thermoplastic; the reinforced fiber may include one or more selected from the group consisting of glass fiber, carbon fiber, and aramid fiber; and the thermoplastic resin may include polypropylene (PP) or polyamide (PA).

The long fiber thermoplastic may include: an amount of about 40 to 60 wt % of a reinforced fiber and an amount of about 40 to 60 wt % of a thermoplastic resin, based on the total weight of the long fiber thermoplastic; the reinforced fiber may include one or more selected from the group consisting of glass fiber, carbon fiber, and aramid fiber; and the thermoplastic resin may include polypropylene (PP) or polyamide (PA).

The property layer may include a fiber reinforced thermosetting composite material.

The fiber reinforced thermosetting composite material may include: an amount of about 20 to 60 wt % of a reinforced fiber and an amount of about 40 to 80 wt % of a thermosetting resin, based on the total weight of the fiber reinforced thermosetting composite material.

The reinforced fiber may include one or more selected from the group consisting of glass fiber, carbon fiber, and aramid fiber, and the thermosetting resin can be any one selected from the group consisting of vinyl ester (VE), polyester (UP), epoxy (EPDXY), and polyurethane (PU).

In an aspect, provided is a fuel cell stack includes: a plurality of fuel cells, an end plate for the fuel cell stack disposed on both side surfaces of the fuel cell stack to maintain the flatness of the fuel cell stack so that the uniform surface pressure is maintained, and a fastening bar for the fuel cell stack disposed outside the fuel cell stack and having both ends coupled to the end plate for the fuel cell stack. Preferably, the end plate may maintain flatness of the fuel cell stack formed by stacking a plurality of fuel cells so that a uniform surface pressure is maintained. Preferably, the fastening bar may be fastened to the end plate that maintains the flatness of a fuel cell stack formed by stacking a plurality of fuel cells so that a uniform surface pressure is maintained to fix the fuel cell stack.

According to various exemplary embodiments of the present invention, as the end plate is made of the composite material other than the steel material, it is possible not only to reduce the weight due to the properties of high specific rigidity and specific strength, but also to improve the efficiency during cold start due to excellent thermal insulation property.

According to t various exemplary embodiments of the present invention, for the end plate made of the composite material, a process such as additionally coating the insulating material can be removed due to the insulating property higher than that of the steel material.

According to various exemplary embodiments of the present invention, it is possible to use the continuous fiber thermoplastic as the property forming part and to use the long fiber thermoplastic as the main body part surrounding the property forming part, thereby achieving the effect of reducing the weight and at the same time, securing the structural stability and the improvement in the fuel cell efficiency.

According to various exemplary embodiments of the present invention, the property forming part made of the continuous fiber thermoplastic has the advantageous effect in terms of securing rigidity because the product is manufactured by the press molding process using the continuous fiber.

According to various exemplary embodiments of the present invention, the property forming part made of the continuous fiber thermoplastic can secure various mechanical properties because its vertical symmetrical or asymmetrical structure can be freely designed according to the structural requirement and the height of the core reinforcement part formed along the outer edge of the property main body can be freely changed. In addition, the main body part made of the long fiber thermoplastic can increase the degree of freedom in the product shaping design.

According to various exemplary embodiments of the present invention, since the property forming part and the main body part use the same polypropylene or polyamide resin, an interface is bonded using the resin heat in the injection processes and the property forming part and the main body part are coupled by the separate bonding process.

The above and other features of the invention are discussed infra.

BRIEF DESCRIPTION OF THE DRAWINGS

The above and other features of the present invention will now be described in detail with reference to certain exemplary examples thereof illustrated in the accompanying drawings which are given herein below by way of illustration only, and thus are not limitative of the present invention, and wherein.

Figure 1:
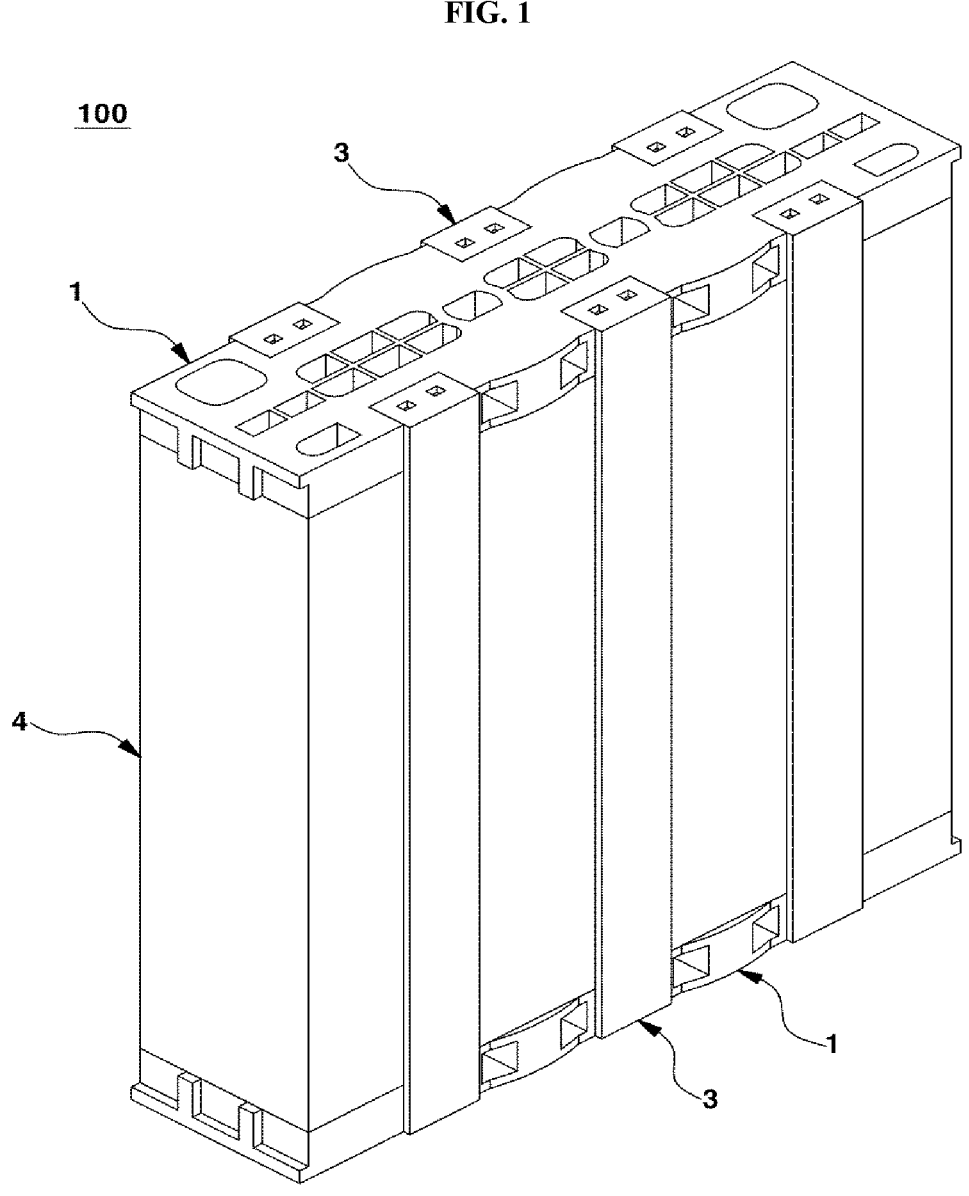
FIG. 1 shows an exemplary fuel cell stack according to an exemplary embodiment of the present invention.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in section by the particular intended application and use environment.

In the figures, reference numbers refer to the same or equivalent sections of the present invention throughout the several figures of the drawing.

DETAILED DESCRIPTION

Hereinafter, exemplary embodiments of the present invention will be described in detail with reference to the accompanying drawings so that those skilled in the art to which the present invention pertains can easily carry out the present invention. However, the present invention can be implemented in various different forms and is not limited to the exemplary embodiments described herein. Throughout the specification, similar parts are denoted by the same reference numerals.

It is understood that the term "automotive" or "vehicular" or other similar term as used herein is inclusive of motor automotives in general such as passenger automobiles including sports utility automotives (operation SUV), buses, trucks, various commercial automotives, watercraft including a variety of boats and ships, aircraft, and the like, and includes hybrid automotives, electric automotives, plug-in hybrid electric automotives, hydrogen-powered automotives and other alternative fuel automotives (e.g., fuels derived from resources other than petroleum). As referred to herein, a hybrid automotive is an automotive that has two or more sources of power, for example both gasoline-powered and electric-powered automotives.

Unless otherwise indicated, all numbers, values, and/or expressions referring to quantities of ingredients, reaction conditions, polymer compositions, and formulations used herein are to be understood as modified in all instances by the term "about" as such numbers are inherently approximations that are reflective of, among other things, the various uncertainties of measurement encountered in obtaining such values.

Further, unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Since an end plate for a fuel cell stack and a fastening bar for the fuel cell stack according to an exemplary embodiment of the present invention can be applied to the fuel cell stack according to the exemplary embodiment of the present invention, hereinafter, the fuel cell stack to which the end plate for the fuel cell stack and the fastening bar for the fuel cell stack are applied will be mainly described.

The fuel cell stack according to the exemplary embodiment of the present invention will be described with reference to FIG. 1.

FIG. 1 shows an exemplary fuel cell stack according to an exemplary embodiment of the present invention.

For example, a fuel cell stack 100 according to an exemplary embodiment includes a fuel cell 4, an end plate 1 for a fuel cell stack (hereinafter referred to as an end plate), and a fastening bar 3 for the fuel cell stack (hereinafter referred to as a fastening bar).

The fuel cell 4 uses hydrogen as a fuel to produce a direct current, and a plurality of them are stacked to form one unit. Here, since a detailed configuration of the fuel cell 4 is the same as that of the fuel cell of the known configuration, a detailed description thereof will be omitted. The end plates 1 are disposed on one surface and the other surface of the fuel cell 4. The end plate 1 is fixed to the fuel cell 4 by the fastening bar 3.

The end plate will be described with further reference to FIGS. 2 to 4.

Figure 2:
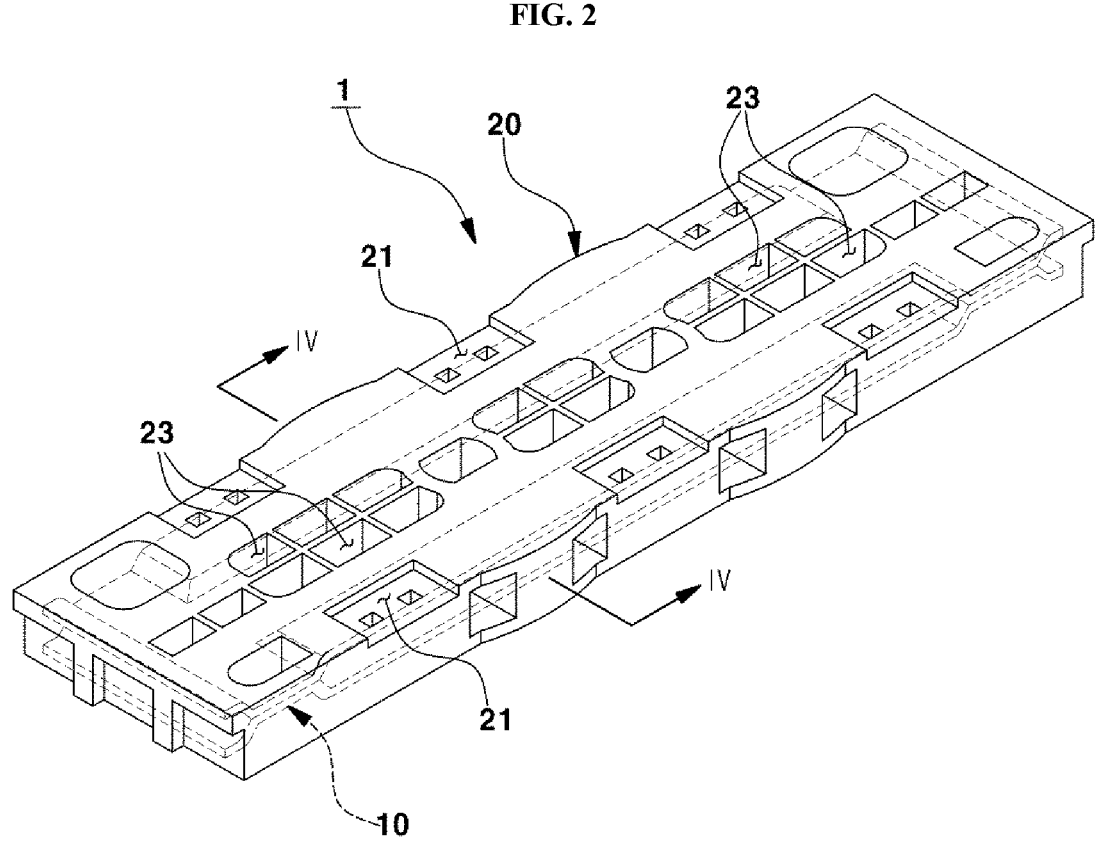
FIG. 2 shows an exemplary end plate for an exemplary fuel cell stack of FIG. 1.
Figure 3:
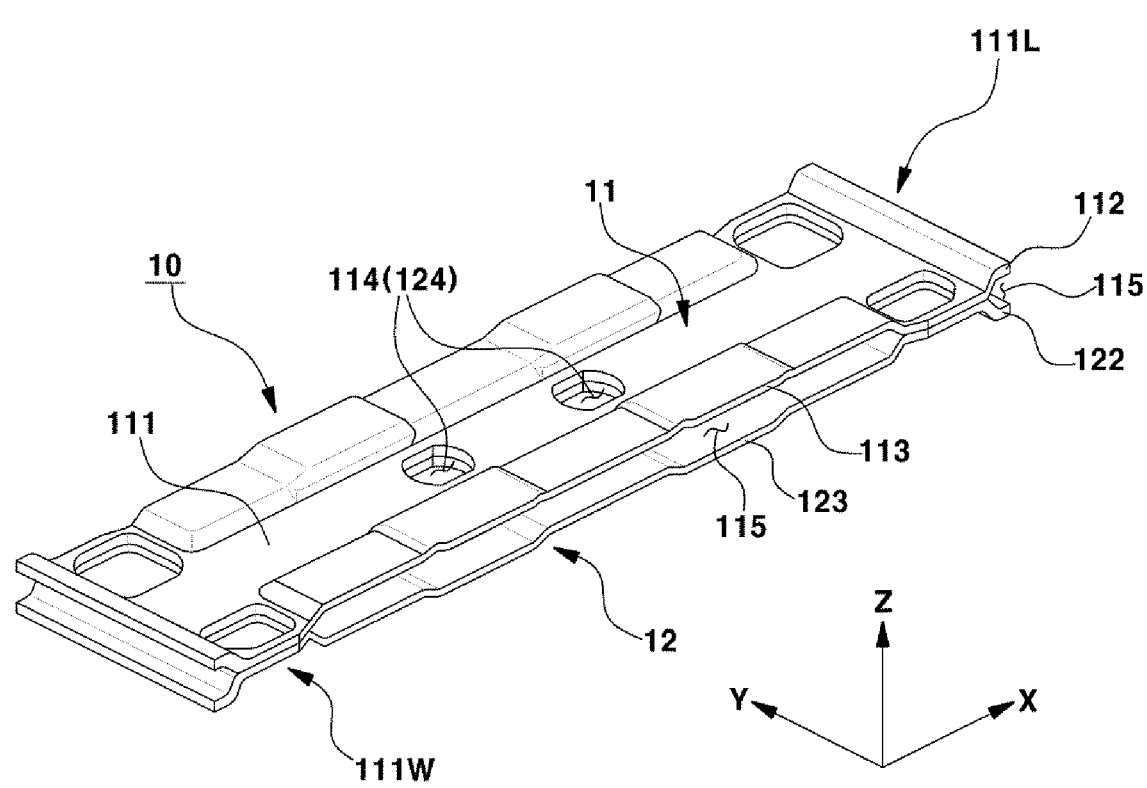
FIG. 3 shows an exemplary property forming part of the end plate for the fuel cell stack.
Figure 4:
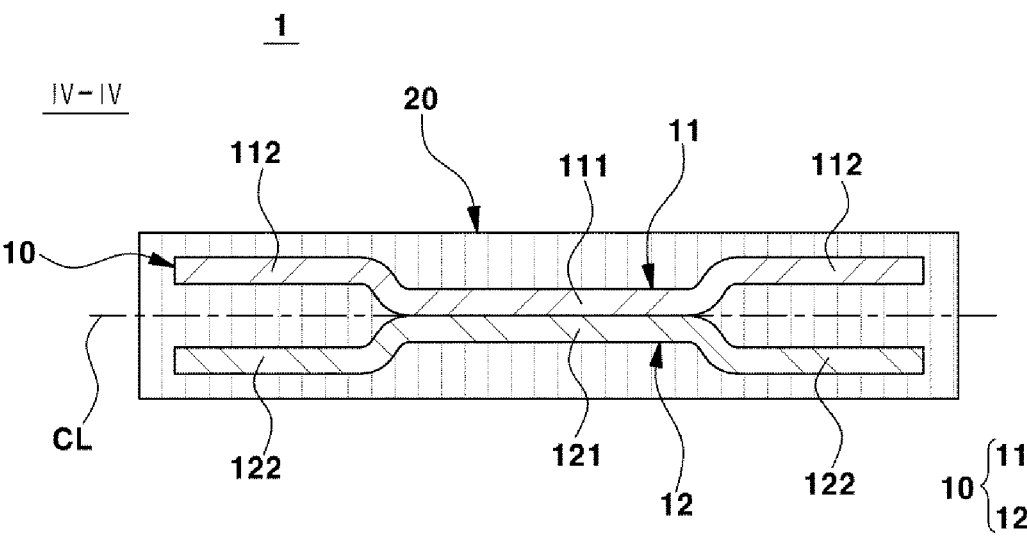
FIG. 4 is a cross-sectional diagram taken along line IV-IV of FIG. 2.

FIG. 2 shows an enlarged diagram of the end plate for the fuel cell stack of FIG. 1, FIG. 3 is an enlarged diagram of a property forming part of the end plate for the fuel cell stack, and FIG. 4 is a cross-sectional diagram taken along line IV-IV of FIG. 2.

As shown in FIGS. 2 to 4, the end plate 1 is disposed on each of the upper and lower surfaces of the fuel cell 4 to maintain the flatness of the stacked fuel cells 4 so that a uniform surface pressure may be maintained. The end plate 1 includes a property forming part 10 and a main body part 20 and may be designed to structurally withstand a high load. The end plate 1 may be manufactured in an insert overmolding method in which the property forming part 10 is applied as an insert to fill its outside with the main body part 20. The property of the property forming part 10 may be insulation, shape maintenance, weight reduction, securing rigidity, free design of the structure, insulation due to very low heat conduction, as well as a mechanical property indicating the correlation between deformation and stress.

The property forming part 10 maintains the rigidity of the end plate 1, and the main body part 20 forms the outer shape of the end plate 1 while surrounding and protecting the property forming part 10. To reduce the weight of the end plate 1, a part of the main body part 20 is recessed to form a weight reduction groove 23. A plurality of weight reduction grooves 23 are formed. Due to the weight reduction groove 23, the end plate 1 can maintain strength while having the reduced weight.

The property forming part 10 and the main body part 20 may include a composite material.

The property forming part 10 may include a continuous fiber thermoplastic (CFT), and the main body part 20 can be made of a long fiber thermoplastic (LFT).

Each of the continuous fiber thermoplastic and the long fiber thermoplastic can include an amount of about 40 to 60 wt % of a reinforced fiber and an amount of about 40 to 60 wt % of a thermoplastic resin, respectively, based on the total weight of the continuous fiber thermoplastic and the long fiber thermoplastic. Here, the reinforced fiber may include one or more selected from the group consisting of glass fiber, carbon fiber, and aramid fiber, and the thermoplastic resin may include polypropylene or polyamide.

When the content of the reinforced fiber is greater than about 60 wt %, the uniformity of structural performance may be reduced due to the occurrence of fiber concentration phenomenon and a problem in that delamination occurs in a fiber concentration part, and when the content of the reinforced fiber is less than about 40 wt %, structural rigidity is not satisfied.

Since the property forming part 10 is manufactured in a press molding process using the continuous fiber, it is advantageous in terms of securing rigidity. The main body part 20 may include the long fiber, thereby increasing the degree of freedom in a shape design. Since the property forming part 10 and the main body part 20 include the same resin (PP or PA), an interface is bonded by the resin heat in an injection process, and therefore, the property forming part 10 and the main body part 20 can be coupled. Therefore, a separate bonding process for coupling the property forming part 10 and the main body part 20 does not occur.

The end plate 1 in which the property forming part 10 and the main body part 20 may include a composite material having specific strength and specific rigidity greater than those of a steel has a very high weight reduction effect. In addition, the structural design of the property forming part 10 can be varied, thereby maximizing the rigidity of the end plate 1.

In addition, it can be seen that the resin made of PP or PA has very low thermal conductivity compared to steel and aluminum as shown in Table 1 below. Therefore, the end plate 1 has the improved efficiency during cold start due to high thermal insulation property.

TABLE 1

| Material | Thermal conductivity(W/mK) |
| --- | --- |
| Steel | 50 |
| Aluminum | 235 |
| Polypropylene (PP) | 0.1 to 0.2 |
| Polyamide (PA) | 0.24 to 0.28 |

In addition, as shown in Table 2 below, since the resin has excellent insulating property compared to the steel material, a process of adding a Teflon coating or an insulating plate formed on the steel material does not occur.

TABLE 2

| Material | Electric resistivity($\Omega \cdot$ cm) |
| --- | --- |
| Steel | $7.2 \times 10^{-5}$ |
| Aluminum | $2.7 \times 10^{-6}$ |
| Polypropylene (PP) | $1.6 \times 10^{16}$ |
| Polyamide (PA) | $1.4 \times 10^{16}$ |

The property forming part 10 includes a first property part 11 and a second property part 12.

The first property part 11 includes a property main body 111, a first rib 112, and a second rib 113.

The property main body 111 is formed in a plane and has a preset width and length. For example, a terminal hole 114 through which a terminal passes vertically penetrates a center of the property main body 111.

The first rib 112 is formed by bending both ends 111L of the property main body 111 in a longitudinal direction upward. The first rib 112 is formed entirely in a width direction Y of the property main body 111. The first rib 112 is formed in a curved shape.

The second rib 113 is formed by bending both ends 111W of the property main body 111 in a width direction upward.

The second rib 113 is formed in the longitudinal direction from the longitudinal center of the property main body 111 and has a planar portion. The first rib 112 and the second rib 113 are not connected.

The second property part 12 includes a property main body 121, a first rib 122, and a second rib 123. In addition, a terminal hole 124 and a weight reduction groove 125 are formed in the property main body 121. Since the property main body 121, the first rib 122, and the second rib 123 of the second property part 12 are the same as the property main body, the first rib, and the second rib of the first property part 11, a duplicated description will be omitted.

The first property part 11 and the second property part 12 are manufactured by compression molding by stacking several sheets of continuous fiber thermoplastic manufactured, respectively in a molding device (not shown). Therefore, the first property part 11 and the second property part 12 are formed in the same shape.

Meanwhile, the first property part 11 is located on the top and the second property part 12 is located under the first property part 11 in an inverted state, and therefore, one surface of the property main body 111 of the first property part 11 and one surface of the property main body 121 of the second property part 12 are in contact with each other. In addition, the first ribs 112, 122 of the first property part 11 and the second property part 12 face each other at an interval. The second ribs 113, 123 of the first property part 11 and the second property part 12 also face each other at an interval. Therefore, the property forming part 10 forms a vertically symmetrical shape with respect to surfaces with which the property main bodies 111, 121 are in contact.

A space 115 is formed between the first ribs 112, 122 and the second ribs 113, 123 as the property forming part 10 has a vertical symmetrical structure with respect to a vertical virtual center line CL.

The main body part 20 is disposed outside the property forming part 10. Since the property forming part 10 is formed to be vertically symmetric, the main body part 20 is formed to be vertically symmetrical with respect to the vertical virtual center line CL.

Meanwhile, since the resins of the composite material constituting the property forming part 10 and the main body part 20 are the same, the property forming part 10 and the main body part 20 are coupled without separate adhesive by the resin heat generated in the injection process in an injection device in which the property forming part 10 is located.

At this time, the surfaces with which the first property part 11 and the second property part 12 are in contact are also coupled to each other. Therefore, the property forming part 10 and the main body part 20 are integrally formed. In addition, the same terminal hole and weight reduction groove are formed in the portion of the main body part 20 that matches with the terminal hole 114 and the weight reduction groove 115 of the property forming part 10.

The thickness of the end plate 1 may be 25 mm to 30 mm. When the thickness of the end plate 1 is less than about 25 mm, the required performance of the finished vehicle cannot be satisfied, and when it is greater than about 30 mm, a manufacturing cost increases along with an increase in the weight. The thickness of the end plate 1 may be 30 mm. In addition, a ratio of the thickness of the property forming part 10 to the thickness of the main body part 20 (total thickness of the end plate) may be about 15% to 25%. When the thickness of the property forming part 10 is less than 15% of the total thickness of the main body part 20, the mechanical property efficiency can be reduced, and when it is greater than about 25%, the mechanical property is improved but the weight of the end plate 1 can increase. Therefore, this can lead to an increase in vehicle weight, which can reduce fuel efficiency.

Additional exemplary embodiment of the end plate will be described with reference to FIGS. 5 to 7.

Figure 5:
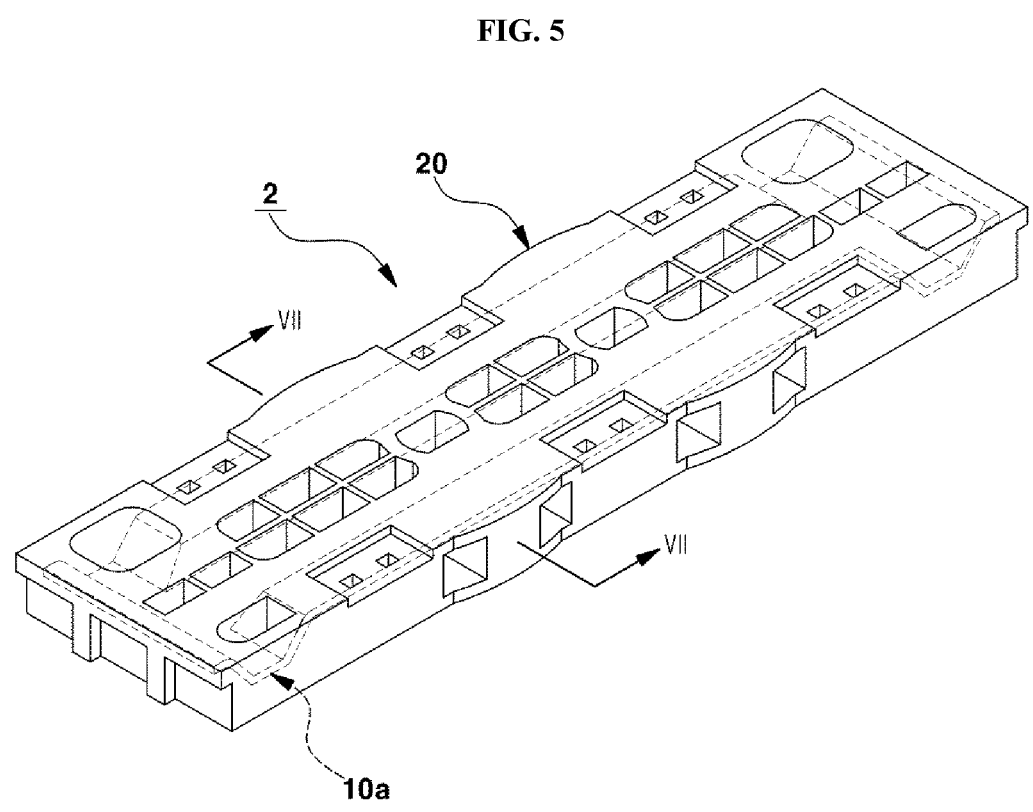
FIG. 5 shows an exemplary embodiment of the end plate for the fuel cell stack of FIG. 2.
Figure 6:
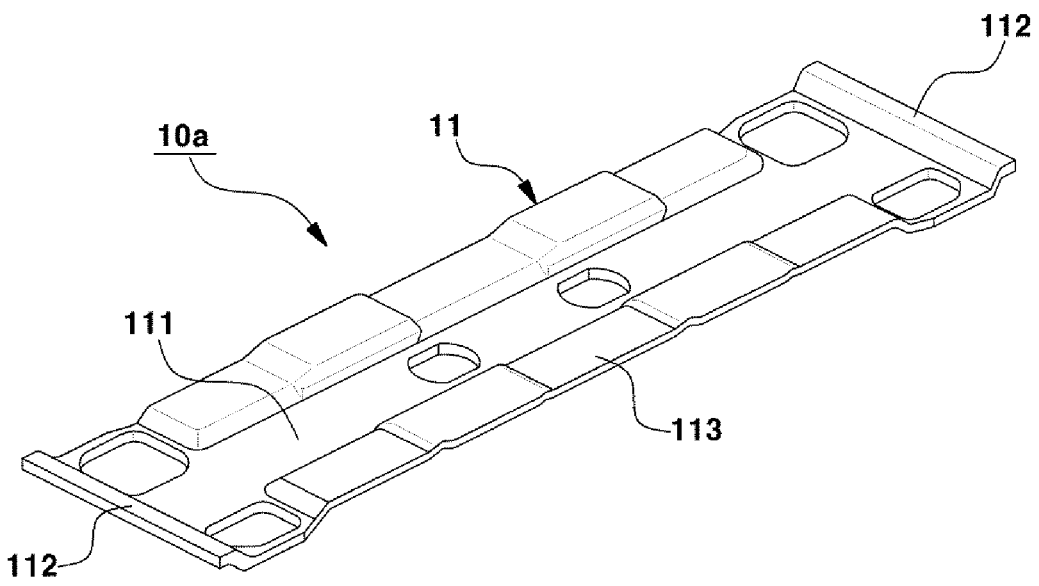
FIG. 6 shows an exemplary property forming part of FIG. 5.
Figure 7:
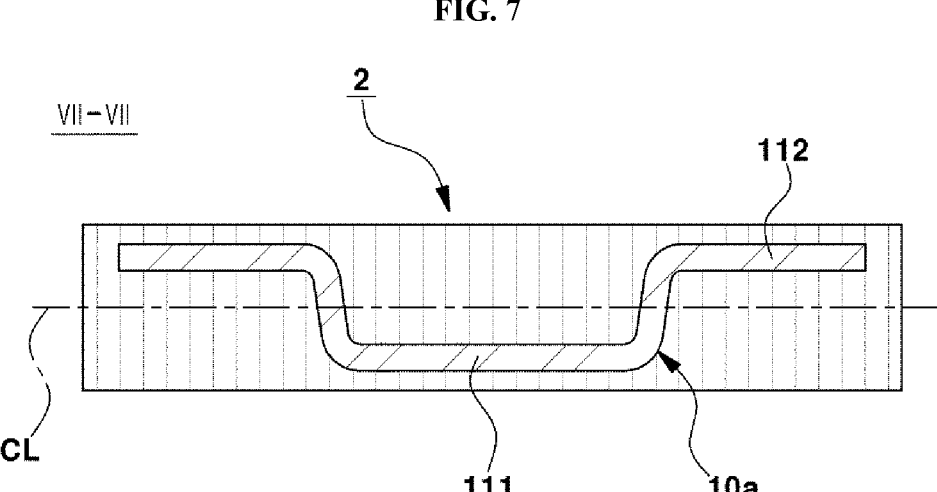
FIG. 7 is a cross-sectional diagram taken along line VII-VII of FIG. 5.

FIG. 5 shows another exemplary embodiment of the end plate for the fuel cell stack of FIG. 2, FIG. 6 is a schematic diagram showing the property forming part of FIG. 5, and FIG. 7 is a cross-sectional diagram taken along line VII-VII of FIG. 5.

It has been described in the exemplary embodiment of FIGS. 2 to 4 that the property forming part 10 includes the first property part 11 and the second property part 12.

However, as in the exemplary embodiment described with reference to FIGS. 5 to 7, for a property forming part 10a, the second property part may be omitted. Therefore, for the property forming part 10a, only the first property part 11 is formed. Therefore, the property forming part 10a is formed in a vertical asymmetrical structure with respect to the vertical virtual center line CL. A main body part 20 may also be formed to be vertically asymmetric. The vertical symmetry or asymmetry of an end plate 2 may be determined according to design requirements of the fuel cell stack. The end plate 2 may derive various mechanical properties vertically symmetrically or asymmetrically. The thickness of the end plate 2 can be 25 mm to 30 mm. Many features described in the exemplary embodiment described with reference to FIGS. 2 to 4 can be applied to the present exemplary embodiment.

Figure 8:
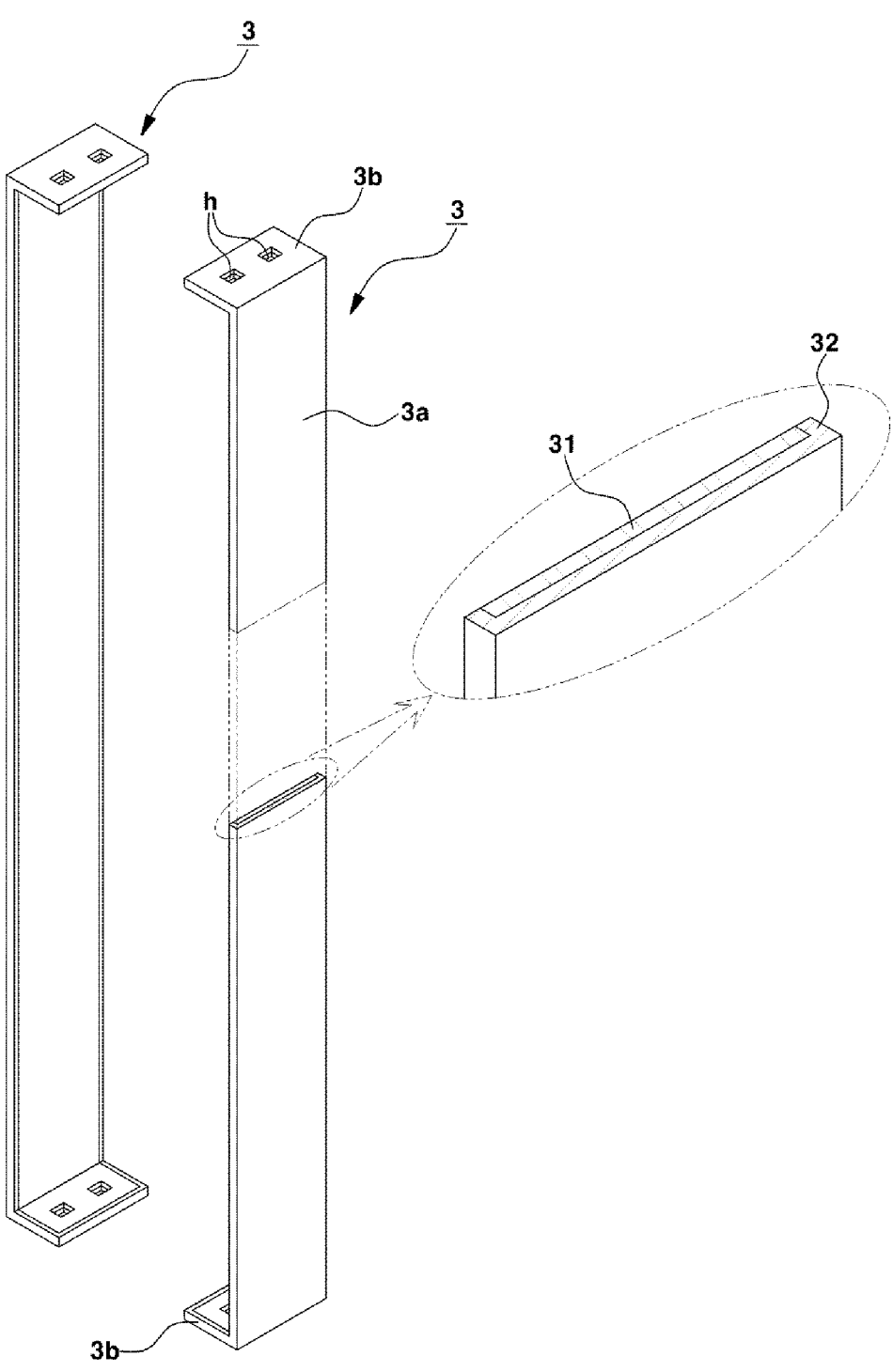
FIG. 8 shows an exemplary fastening bar for the fuel cell stack of FIG. 1.

Next, the fastening bar will be described with reference to FIGS. 8 and 9, FIG. 8 is a schematic diagram showing a fastening bar for the fuel cell stack of FIG. 1, and FIGS. 9A-9F is a schematic diagram showing an exemplary embodiment of the fastening bar for the fuel cell stack of FIG. 8.

First, further referring to FIG. 8, for the end plate according to the present exemplary embodiment, the fastening bar 3 may be formed in the thickness of 1 mm to 5 mm. The fastening bar 3 includes a bar main body 3a and a coupling part 3b.

The coupling part 3b is formed by bending one side and the other side of the bar main body 3a in a longitudinal direction at right angles in one direction, and therefore the bar main body 3a and the coupling part 3b are integrally formed.

The bar main body 3a and the coupling part 3b include a design layer 32 and a property layer 31, respectively. The bar main body 3a and the coupling part 3b are manufactured in an insert overmolding method and are formed in different types of structures.

Here, the thickness of the design layer 32 is formed to be greater than the thickness of the property layer 31. However, the thicknesses of the property layer 31 and the design layer 32 can be the same.

One surface of the property layer 31 is in contact with the fuel cell, and the other surface thereof is not in contact with the fuel cell. For example, the property layer of the coupling part 3b is in contact with the end plate 1. A seating groove 21 (see FIG. 2) is formed in the portion of the end plate 1. The coupling part 3b is located in the seating groove 21 and fixed by a fastening means (not shown) such as a screw and a rivet. Therefore, a through hole (h) through which the fastening means passes is formed in the coupling part 3b.

The design layer 32 is disposed along at least three surfaces of the property layer 31 and is not in contact with the fuel cell. However, the property layer 31 can surround all surfaces of the property layer 31.

The property layer 31 may include continuous fiber thermoplastic (CFT). The design layer 32 may include long fiber thermoplastic (LFT).

Each of the continuous fiber thermoplastic and the long fiber thermoplastic may include an amount of about 20 to 40 wt % of a reinforced fiber and an amount of about 60 to 80 wt % of a thermoplastic resin, respectively, based on the total weight of the continuous fiber thermoplastic and the long fiber thermoplastic.

Alternatively, each the continuous fiber thermoplastic and the long fiber thermoplastic may include 40 to 60 wt % of a reinforced fiber and 40 to 60 wt % of a thermoplastic resin, respectively based on the total weight of the continuous fiber thermoplastic and the long fiber thermoplastic.

The reinforced fiber may include one or more selected from the group consisting of glass fiber, carbon fiber, and aramid fiber, and the thermoplastic resin may include polypropylene (PP) or polyamide (PA).

When the content of the reinforced fiber is greater than about 60 wt %, the uniformity of the structural performance may be reduced due to the occurrence of fiber concentration, and a problem in that delamination occurs in the fiber concentration part, and when the content of the reinforced fiber is less than 20 wt %, the structural rigidity is not satisfied.

In addition, when the content of the thermoplastic resin is greater than about 80 wt %, a manufacturing cost may increase, and when the content of the thermoplastic resin is less than about 60 wt %, a coupling force between the design layer and the property layer can be reduced.

The property layer 31 and the design layer 32 of the fastening bar 3 according to the present exemplary embodiment may have the features of the property forming part and the main body part of the end plate according to the exemplary embodiment described with reference to FIGS. 2 to 7. Therefore, a duplicated description will be omitted.

Figure 9A:
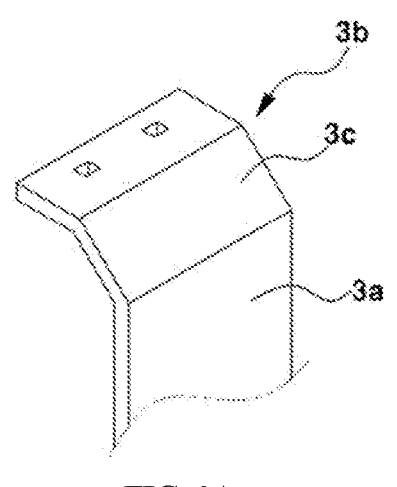
FIGS. 9A-9F show exemplary fastening bars for the fuel cell stack of FIG. 8.

In addition, the bar main body 3a and the coupling part 3b are connected by an inclined surface 3c as shown in FIG. 9A. The length of the inclined surface 3c can be the same as the length of the coupling part 3b. Although not shown in the drawings, an inclined surface can be formed between the seating groove 21 and the side surface of the end plate 1 in contact with the inclined surface 3c.

Figure 9B:
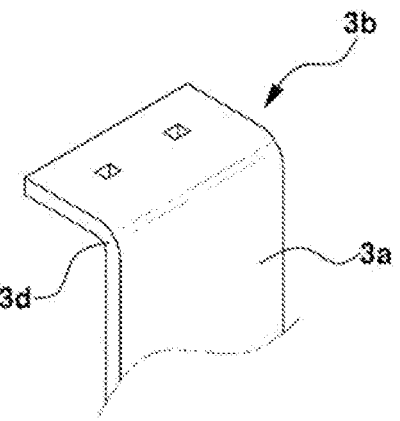

As shown in FIG. 9B, the coupling part 3b is formed by bending the bar main body 3a at a right angle, and the bent portion is formed as a curved surface 3d. It is possible to minimize the stress concentration in the bent portion by the curved surface.

Figure 9C:
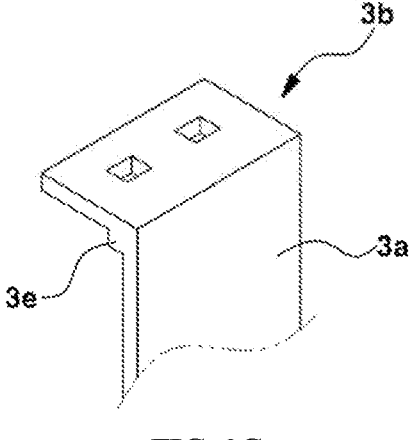

As shown in FIG. 9C, the coupling part 3b is formed by bending the bar main body 3a at a right angle, and a reinforced projection 3e is formed on the bent inner portion. A groove (not shown) in which the reinforced projection 3d is seated can be formed in the end plate 1.

Figure 9D:
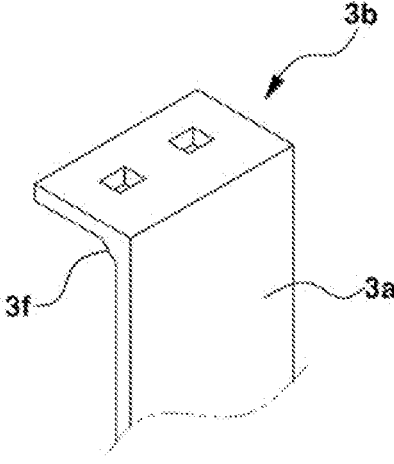

As shown in FIG. 9D, the coupling part 3b is formed by bending the bar main body 3a at a right angle, and the bent inner portion is processed as a chamfering 3f.

Figure 9E:
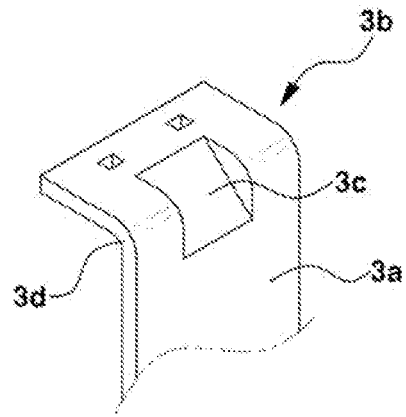

As shown in FIG. 9E, the coupling part 3b is formed by bending the bar main body 3a at a right angle, and a part of the bent portion is formed as the inclined surface 3c and a part thereof is formed as the curved surface 3d. It is possible to minimize the stress concentration in the bent portion by the curved surface 3d and the inclined surface 3c.

Figure 9F:
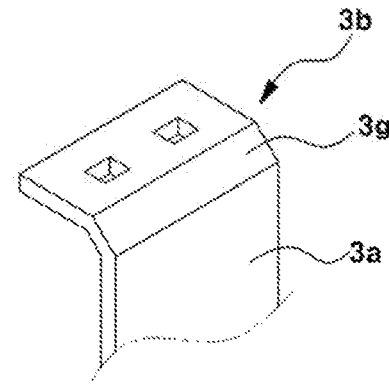

As shown in FIG. 9F, the coupling part 3*b* is formed by bending the bar main body 3*a* at a right angle, and the inside and outside of the bent portion are processed as a chamfering 3*g*.

Next, another exemplary embodiment of the fastening bar for the fuel cell stack will be described with reference to FIG. 10.

Figure 10:
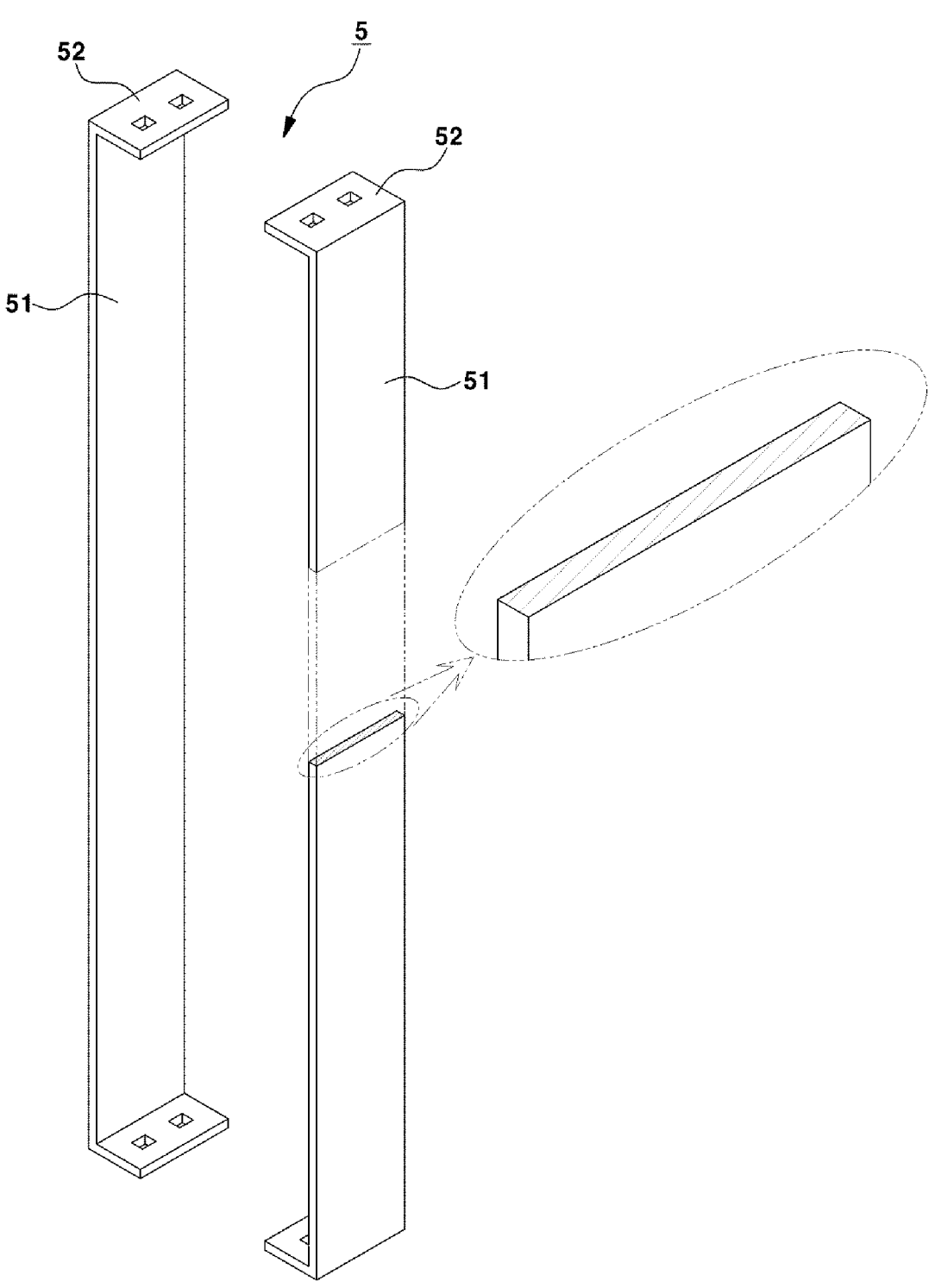
FIG. 10 shows an exemplary embodiment of the fastening bar for the fuel cell stack of FIG. 8.

FIG. 10 shows an exemplary embodiment of the fastening bar for the fuel cell stack of FIG. 8.

As shows in FIG. 10, for the fastening bar 5 for the fuel cell stack according to the present exemplary embodiment, the design layer of the fastening bar 3 according to the exemplary embodiments described with reference to FIGS. 8 and 9 is omitted and the fastening bar 5 is composed of only the property layer.

The fastening bar 5 according to the present exemplary embodiment may include a single layer including a bar main body 51 and a coupling part 52, in which the design layer is omitted and the fastening bar 5 is composed of only the property layer. Therefore, the fastening bar 5 according to the present exemplary embodiment is formed in a single structure, and the property layer can be made of a long fiber thermoplastic.

The long fiber thermoplastic may include an amount of about 20 to 40 wt % of a reinforced fiber and an amount of about 60 to 80 wt % of a thermoplastic resin based on the total weight of the long fiber thermoplastic. Alternatively, the long fiber thermoplastic may include an amount of about 40 to 60 wt % of the reinforced fiber and an amount of about 40 to 60 wt % of the thermoplastic resin, based on the total weight of the continuous fiber thermoplastic and the long fiber thermoplastic.

The reinforced fiber may include one or more selected from the group consisting of glass fiber, carbon fiber, and aramid fiber, and the thermoplastic resin can be polypropylene or polyamide. For other configurations, the configuration of the exemplary embodiment described with reference to FIGS. 8 and 9 can be applied as it is.

Still another exemplary embodiment of the present invention has most of the components of the exemplary embodiment described with reference to FIG. 10. However, a property layer of the present exemplary embodiment can be made of a fiber reinforced thermosetting composite material. The fiber reinforced thermosetting composite material may include an amount of about 20 to 60 wt % of the reinforced fiber and an amount of about 40 to 80 wt % of the thermosetting resin based on the total weight of the fiber reinforced thermosetting composite material.

The reinforced fiber may include one or more selected from the group consisting of glass fiber, carbon fiber and aramid fiber. The thermosetting resin can be made of any one selected from the group consisting of vinyl ester (VE), polyester (UP), epoxy (EPDXY), and polyurethane (PU). The fastening bar has excellent effects of heat resistance, solvent resistance, chemical resistance, mechanical properties, and electrical insulation by the thermosetting resin.

EXAMPLE

Experimental Example 1

The end plate having the property forming part and the main body part made of the composite material was manufactured.

For the end plate 1, the required performance of the finished vehicle should be satisfied. In this regard, analysis was conducted to verify the performance of the end plate to which the composite material was applied, and the test specifications and the required performance were as follows.

Test Method: 3-Point Bending Test

Example 1

To form the property forming part 10 constituting the end plate 1, the continuous fiber thermoplastic (CFT) including 60 wt % of the glass fiber and 40 wt % of the polypropylene was used. In the manufacturing process, after manufacturing the continuous fiber thermoplastic, several sheets were stacked and subjected to compression molding to form the property forming part 10 composed of the property main body, the first rib, and the second rib.

To form the main body 20 outside the property forming part 10, the long fiber thermoplastic (LFT) including 60 wt % of the glass fiber and 40 wt % of the polypropylene was used.

First, the property forming part 10 was formed into the first property part and the second property part and disposed in the mold to form vertical symmetry. In addition, the long fiber thermoplastic was cut by a regular length, and then put into the mold in which the property forming part 10 was disposed. The end plate was manufactured using a one-shot overmolding method formed in the single mold. The cross-sectional shape of the end plate finally completed through the insert one-shot overmolding process had a vertically symmetrical structure according to the design of the property forming part. The thickness of the property forming part 10 in the manufactured end plate 1 was 30 mm.

Example 2

The second property part of the property forming part 10 is omitted and composed of only the first property part, and therefore, the cross-sectional shape of the end plate has the vertically asymmetrical structure according to the design of the property forming part composed of only the first property part. The end plate was manufactured in the same manner as in Example 1, except that the thickness of the property forming part 10 was 25 mm.

Comparative Example 1

The end plate was manufactured in the same manner as in Example 1 while the property forming part 10 was vertically symmetrical and had the thickness of 25 mm.

TABLE 3

| Thickness (mm) | | Performance |
|---|---|---|
| Example 1 | 30 | 159 |
| Example 2 | 25 | 105 |
| Comparative Example 1 | 25 | 91 |

Referring to Table 3, the three-point bending test was performed using the end plates of Examples 1 and 2 and Comparative Example 1.

For Comparative Example 1, the property forming part was designed to have the vertically symmetrical structure, and the required performance was not satisfied at the thickness of 25 mm.

For Example 1, the property forming part was designed to have the vertically symmetrical structure, and the required performance was satisfied at the thickness of 30 mm.

For Example 2, the property forming part was designed to have the vertically asymmetrical structure, and the thickness was formed at 25 mm in the same manner as in Comparative Example 1, and the required performance was satisfied.

Although the preferred exemplary embodiments of the present invention have been specifically described above, the scope of the present invention is not limited thereto, and various modifications and improvements by those skilled in the art using the basic concept of the present invention defined by the appended claims also fall within the scope of the present invention.

What is claimed is:

1. An end plate for a fuel cell stack comprising:
a main body part; and
a property forming part disposed in the main body part to exert mechanical properties,
wherein each of the main body part and the property forming part comprises a composite material; and
wherein surfaces in contact between the main body part and the property forming part are coupled together by heat bonding by resin heat generated in an injection process;
wherein the property forming part comprises: first property part and a second property part that are formed to be symmetrical with respect to surfaces in contact with each other;
wherein each of the first property part and the second property part comprises:
a property main body having a weight reduction groove formed on both ends of a terminal hole in a longitudinal direction;
a first rib formed on both ends of the property main body in the longitudinal direction to secure mechanical properties; and
a second rib formed on both ends of the property main body in a width direction to secure mechanical properties, and
wherein the property main body of the first property part and the property main body of the second property part are in contact with each other, the first rib of the first property part and the first rib of the second property part face each other at an interval, and the second rib of the first property part and the second rib of the second property part are disposed to face each other at an interval and disposed to be vertically symmetrical with respect to surfaces with which the first property part and the second property part are in contact.

2. The end plate for the fuel cell stack of claim 1, wherein the property forming part comprises continuous fiber thermoplastic.

3. The end plate for the fuel cell stack of claim 2, wherein the main body part comprises long fiber thermoplastic.

4. The end plate for the fuel cell stack of claim 3, wherein each of the continuous fiber thermoplastic and the long fiber thermoplastic comprises: an amount of about 40 to 60 wt % of a reinforced fiber and an amount of about 40 to 60 wt % of a thermoplastic resin, respectively, based on the total weight of the continuous fiber thermoplastic and the long fiber thermoplastic.

5. The end plate for the fuel cell stack of claim 4, wherein the reinforced fiber comprises one or more selected from the group consisting of glass fiber, carbon fiber, and aramid fiber, and the thermoplastic resin comprises polypropylene or polyamide.

6. The end plate for the fuel cell stack of claim 1, wherein the first rib is formed entirely in the width direction of the property main body and the second rib is formed at a preset length from a center to both sides in the longitudinal direction of the property main body.

7. The end plate for the fuel cell stack of claim 1, wherein for the first property part and the second property part, surfaces in contact with each other are coupled to each other by heat bonding by resin heat generated in an injection process.

8. The end plate for the fuel cell stack of claim 1, wherein the thickness of the end plate for the fuel cell stack is about 25 mm to 30 mm.

9. The end plate for the fuel cell stack of claim 8, wherein a ratio of the thickness of the property forming part to the thickness of the main body part is about 15% to 25%.

10. A fastening bar for a fuel cell stack comprising:
a bar main body in contact with an outside of the fuel cell stack; and
a coupling part coupled to an end plate of the fuel cell by bending one end and the other end of the bar main body in one direction,
wherein the bar main body and the coupling part formed integrally comprise:
a design layer; and
a property layer connected with the design layer to exert mechanical properties,
wherein the design layer and the property layer are made of a composite material; and
wherein surfaces in contact between the design layer and the property layer are coupled together by heat bonding by resin heat generated in an injection process:
wherein the property forming part comprises: a first property part and a second property part that are formed to be symmetrical with respect to surfaces in contact with each other;
wherein each of the first property part and the second property part comprises:
a property main body having a weight reduction groove formed on both ends of a terminal hole in a longitudinal direction;
a first rib formed on both ends of the property main body in the longitudinal direction to secure mechanical properties; and
a second rib formed on both ends of the property main body in a width direction to secure mechanical properties, and
wherein the property main body of the first property part and the property main body of the second property part are in contact with each other, the first rib of the first property part and the first rib of the second property part face each other at an interval, and the second rib of the first property part and the second rib of the second property part are disposed to face each other at an interval and disposed to be vertically symmetrical with respect to surfaces with which the first property part and the second property part are in contact.

11. The fastening bar for the fuel cell stack of claim 10, wherein the property layer comprises continuous fiber thermoplastic, and the design layer comprises long fiber thermoplastic (LFT).

12. The fastening bar for the fuel cell stack of claim 11, wherein each the continuous fiber thermoplastic and the long fiber thermoplastic comprises: an amount of about 20 to 40 wt % of the reinforced fiber and an amount of about 60 to 80 wt % of the thermoplastic resin, respectively, based on the total weight of the continuous fiber thermoplastic and the long fiber thermoplastic.

13. The fastening bar for the fuel cell stack of claim 12, wherein the reinforced fiber comprises one or more selected from the group consisting of glass fiber, carbon fiber, and aramid fiber, and the thermoplastic resin comprises polypropylene or polyamide.

14. The fastening bar for the fuel cell stack of claim 11, wherein each of the continuous fiber thermoplastic and the long fiber thermoplastic comprise: an amount of about 40 to 60 wt % of the reinforced fiber and an amount of about 40 to 60 wt % of the thermoplastic resin, respectively, based on the total weight of the continuous fiber thermoplastic and the long fiber thermoplastic.

15. The fastening bar for the fuel cell stack of claim 14, wherein the reinforced fiber comprises one or more selected from the group consisting of glass fiber, carbon fiber, and aramid fiber, and the thermoplastic resin comprises polypropylene or polyamide.

16. The fastening bar for the fuel cell stack of claim 10, wherein the thicknesses of each of the bar main body and the coupling part is about 1 mm to 5 mm.

17. The fastening bar for the fuel cell stack of claim 10, wherein the coupling part comprises a through hole through which a fastening means coupled to the end plate passes.

18. A fastening bar for a fuel cell stack comprising:

a bar main body in contact with an outside of the fuel cell stack; and a coupling part coupled to the end plate by bending one end and the other end of the bar main body in one direction, wherein the bar main body and the coupling part formed integrally comprise: a property layer made of a composite material to exert mechanical properties;

wherein surfaces in contact between the main bar body and the coupling part are coupled together by heat bonding by resin heat generated in an injection process, wherein the property forming part con: a first property part and a second property part that are formed to be symmetrical with surfaces in contact with each other;

wherein each of the first property part and the second property part comprises:

a property main body having a weight reduction groove formed on both ends of a terminal hole in a longitudinal direction, a first rib formed on both ends of the property main body in the longitudinal direction to secure mechanical properties, and a second rib formed on both ends of the property main body in a width direction to secure mechanical properties, and wherein the property main body of the first property rt and the property main body of the second property part are in contact with each other, the first rib of the first property part and the first rib of the second property part face each other at an interval, and the second rib of the first property part and the second rib of the second property part are disposed to face each other at an interval and disposed to be vertically symmetrical with respect to surfaces with which the first property part and the second property part are in contact.

19. The fastening bar for the fuel cell stack of claim 18, wherein the property layer comprises long fiber thermoplastic.

20. The fastening bar for the fuel cell stack of claim 19, wherein the long fiber thermoplastic comprises: an amount of about 20 to 40 wt % of a reinforced fiber and an amount of about 60 to 80 wt % of a thermoplastic resin, based on the total weight of the long fiber thermoplastic; the reinforced fiber comprises one or more selected from the group consisting of glass fiber, carbon fiber, and aramid fiber; and the thermoplastic resin comprises polypropylene or polyamide.

21. The fastening bar for the fuel cell stack of claim 19, wherein the long fiber thermoplastic comprises: an amount of about 40 to 60 wt % of a reinforced fiber and an amount of about 40 to 60 wt % of a thermoplastic resin, based on the total weight of the long fiber thermoplastic; the reinforced comprises one or more selected from the group consisting of glass fiber, carbon fiber, and aramid fiber; and the thermoplastic resin comprises polypropylene or polyamide.

22. The fastening bar for the fuel cell stack of claim 18, wherein the property layer comprises a fiber reinforced thermosetting composite material.

23. The fastening bar for the fuel cell stack of claim 22, wherein the fiber reinforced thermosetting composite material comprises: an amount of about 20 to 60 wt % of a reinforced fiber and an amount of about 40 to 80 wt % of a thermosetting resin based on the total weight of fiber reinforced thermosetting composite material, the reinforced fiber comprises one or more selected from the group consisting of glass fiber, carbon fiber, and aramid fiber, and the thermosetting resin is any one or more selected from the group consisting of vinyl ester, polyester, epoxy, and polyurethane.

24. A fuel cell stack comprising:

a plurality of fuel cells;

the end plate for the fuel cell stack of claim 1, wherein the end plate is disposed on both side surfaces of the fuel cell stack to maintain the flatness of the fuel cell stack so that the uniform surface pressure is maintained; and the fastening bar for the fuel cell stack of claim 10, wherein the fastening bar is disposed outside the fuel cell stack and having both ends coupled to the end plate for the fuel cell stack, wherein the end plate maintains flatness of the fuel cell stack formed by stacking a plurality of fuel cells so that a uniform surface pressure is maintained, and wherein the fastening bar is fastened to the end plate that maintains the flatness of a fuel cell stack formed by stacking a plurality of fuel cells so that a uniform surface pressure is maintained to fix the fuel cell stack.

* * * * *